(12) United States Patent
Wang et al.

(10) Patent No.: US 11,706,471 B2
(45) Date of Patent: Jul. 18, 2023

(54) SCHEDULING METHOD, SERVER, FIRST PEER NODE AND COMPUTER-READABLE STORAGE MEDIUM

(71) Applicants: CHINA MOBILE COMMUNICATION LTD., RESEARCH INSTITUTE, Beijing (CN); CHINA MOBILE COMMUNICATIONS CORPORATION, Beijing (CN)

(72) Inventors: Jing Wang, Beijing (CN); Hui Wang, Beijing (CN)

(73) Assignees: CHINA MOBILE COMMUNICATION CO., LTD RESEARCH INST, Beijing (CN); CHINA MOBILE COMMUNICATIONS GROUP CO., LTD., Beijing (CN)

( * ) Notice: Subject to any disclaimer, the term of this patent is extended or adjusted under 35 U.S.C. 154(b) by 973 days.

(21) Appl. No.: 16/324,954

(22) PCT Filed: Sep. 26, 2017

(86) PCT No.: PCT/CN2017/103474
§ 371 (c)(1),
(2) Date: Feb. 12, 2019

(87) PCT Pub. No.: WO2018/068635
PCT Pub. Date: Apr. 19, 2018

(65) Prior Publication Data
US 2021/0289246 A1    Sep. 16, 2021

(30) Foreign Application Priority Data
Oct. 13, 2016    (CN) .......................... 201610895287.8

(51) Int. Cl.
*H04N 21/262* (2011.01)
*H04L 67/104* (2022.01)
(Continued)

(52) U.S. Cl.
CPC ..... *H04N 21/26208* (2013.01); *H04L 67/104* (2013.01); *H04L 67/1021* (2013.01);
(Continued)

(58) Field of Classification Search
CPC .......... H04N 21/26208; H04N 21/238; H04N 21/632; H04L 67/1021; H04L 67/104; H04L 67/1063
See application file for complete search history.

(56) References Cited

U.S. PATENT DOCUMENTS 8,996,723 B2 * 3/2015 Li .................. H04L 67/1021
                                                709/219
9,021,018 B2    4/2015 Kiesel
(Continued)

FOREIGN PATENT DOCUMENTS

CN      101414975 A  *  4/2009  ............ H04L 29/08
CN      101414975 A      4/2009
(Continued)

OTHER PUBLICATIONS

International Search Report in the international application No. PCT/CN2017/103474, dated Dec. 28, 2017.
(Continued)

*Primary Examiner* — Jefferey F Harold
*Assistant Examiner* — Alexander Boyd
(74) *Attorney, Agent, or Firm* — Syncoda LLC; Feng Ma

(57) ABSTRACT

A scheduling method includes: a server receiving a first request of a first peer (P2P) node; the first request containing service content; using position information on different network hierarchies of the first P2P node and the service
(Continued)

content to determine at least one candidate P2P node for the first P2P node; the at least one candidate P2P node can provide a service for the first P2P node; the position information being position information generated on the basis of a network topology structure; using the at least one candidate P2P node to generate a candidate P2P node information list; P2P node information in the information list representing a transmission distance between the at least one candidate P2P node and the first P2P node; and returning the information list to the first P2P node. Further disclosed at the same time are a server, a first P2P node and a computer-readable storage medium.

16 Claims, 7 Drawing Sheets

(51) Int. Cl.
   *H04N 21/238*   (2011.01)
   *H04N 21/63*   (2011.01)
   *H04L 67/1061*   (2022.01)
   *H04L 67/1021*   (2022.01)
(52) U.S. Cl.
   CPC ....... *H04L 67/1063* (2013.01); *H04N 21/238* (2013.01); *H04N 21/632* (2013.01)

(56) References Cited

U.S. PATENT DOCUMENTS

| | | |
|---|---|---|
| 2009/0210545 A1 | 8/2009 | Wright |
| 2012/0036193 A1* | 2/2012 | Abuan ................. H04L 67/104 709/204 |
| 2012/0215850 A1 | 8/2012 | Kiesel |
| 2014/0244763 A1* | 8/2014 | Su ........................ H04L 67/104 709/205 |

FOREIGN PATENT DOCUMENTS

| | | | |
|---|---|---|---|
| CN | 101651708 A | 2/2010 | |
| CN | 101964741 A | 2/2011 | |
| CN | 104009857 A | 8/2014 | |
| CN | 104507066 A | 4/2015 | |
| CN | 105099926 A | 11/2015 | |
| CN | 109039703 A | 12/2018 | |
| EP | 2086206 A1 * | 8/2009 | ........... H04L 67/104 |

OTHER PUBLICATIONS

English translation of the Written Opinion of the International Search Authority in the international application No. PCT/CN2017/103474, dated Dec. 28, 2017.

* cited by examiner

SCHEDULING METHOD, SERVER, FIRST PEER NODE AND COMPUTER-READABLE STORAGE MEDIUM

CROSS-REFERENCE TO RELATED APPLICATION

The present application is based upon and claims priority to Chinese Patent Application No. 201610895287.8, filed on Oct. 13, 2016, the contents of which are hereby incorporated by reference in its entirety.

TECHNICAL FIELD

The disclosure relates to a Content Delivery Network (CDN), and particularly, to a scheduling method, a server, a first Peer to Peer (P2P) node and a computer-readable storage medium.

BACKGROUND

A P2P CDN technology is a novel CDN technology in which user equipment is used as a content service edge node of a CDN to serves another user equipment. A core concept of a P2P CDN is to utilize user resources to implement content delivery service between user equipment through P2P user terminal devices. That is, different user equipment, as different P2P nodes, provides video content delivery service responsive to video service requests from other user equipment. This is different from a Client/Server (C/S) transmission model of a conventional CDN that a content service edge node server provides service responsive to a video service request from user equipment.

In a P2P CDN technology-based content delivery flow, a shortest content delivery transmission path (route) should be selected as much as possible to shorten a transmission delay when a P2P node serves another P2P node. For example, if a scheduling server (tracker server) of a P2P CDN system, when receiving a request from a user A for acquiring a certain content, finds that there are exactly other P2P nodes (probably more than one) capable of providing content delivery service for the user A at present in a neighboring region (for example, under the same Broadband Remote Access Server (BRAS) device) where the user A is located, these P2P nodes are preferably selected to provide the service to the user A.

The scheduling server may speculate distances between P2P nodes according to similarities between Internet Protocol (IP) addresses of different P2P node networks. However, such a speculation method for distances between different nodes are not so accurate.

SUMMARY

In order to solve the existing technical problem, embodiments of the disclosure provide a scheduling method, a server, a first P2P node and a computer-readable storage medium.

The technical solutions of the embodiments of the disclosure are implemented as follows.

The embodiments of the disclosure provide a scheduling method, which may be applied to a server and include the following operations.

A first request from a first P2P node is received, the first request including a service content.

At least one candidate P2P node is determined for the first P2P node using position information of the first P2P node in different network layers and the service content, the at least one candidate P2P node being capable of providing service to the first P2P node and the position information being position information generated based on a network topology structure.

A candidate P2P node information list is generated using the at least one candidate P2P node, P2P node information in the information list representing a transmission distance between the at least one candidate P2P node and the first P2P node.

The information list is returned to the first P2P node.

In the solution, the operation that the at least one candidate P2P node is determined for the first P2P node using the position information of the first P2P node in different network layers and the service content may include the following operation.

The at least one candidate P2P node is determined for the first P2P node using at least one network address supported by the first P2P node and the service content.

In the solution, the operation that the at least one candidate P2P node is determined for the first P2P node using the at least one network address supported by the first P2P node and the service content may include the following operations.

For each network address supported by the first P2P node, at least one P2P node capable of providing the service to the first P2P node is determined based on the service content.

The P2P node of which a transmission distance with the first P2P node is shortest is selected from the determined at least one P2P node as a candidate P2P node corresponding to said each network address.

Correspondingly, when the information list is generated, the method may further include the following operation.

For each network address supported by the first P2P node, a network address of the candidate P2P node corresponding to said each network address is written into the information list.

Each network address of the first P2P node and the network address of the corresponding candidate P2P node may be network addresses in a same network layer.

In the solution, when the information list is generated, the method may further include the following operation.

Network addresses of candidate P2P nodes corresponding to all network addresses supported by the first P2P node are sequenced in the information list according to a manner of sequencing in ascending order of transmission distances between the candidate P2P nodes and the first P2P node.

In the solution, before the operation that the first request from the first P2P node is received, the method may further include the following operation.

Responsive to learning that the first P2P node is on line, the position information of the first P2P node is acquired from a network topology information management device.

The embodiments of the disclosure also provide a scheduling method, which may be applied to a first P2P node and include the following operations.

A first request is sent to a server, the first request including a service content and the first request being configured to request the server for an information list indicating candidate P2P nodes capable of providing the service content.

The information list returned by the server is received, P2P node information in the information list representing a transmission distance between at least one candidate P2P node and the first P2P node.

A second P2P node is selected from the information list according to the information list, the second P2P node being capable of providing service to the first P2P node.

The service content is acquired from the second P2P node for presentation.

In the solution, the information list may include a network address of the candidate P2P node corresponding to each network address supported by the first P2P node; and each network address of the first P2P node and the network address of the corresponding candidate P2P node may be network addresses in a same network layer.

Correspondingly, the operation that the second P2P node is selected from the information list according to the information list may include the following operations.

The second P2P node is selected according to the network address of the candidate P2P node corresponding to each network address.

Correspondingly, the first P2P node communicates with the second P2P node using a network address of the second P2P node to acquire the service content.

In the solution, a manner for sequencing the network addresses of the candidate P2P nodes corresponding to all network addresses supported by the first P2P node in the information list may be a manner of sequencing in ascending order of transmission distances between the candidate P2P nodes and the first P2P node.

Correspondingly, the second P2P node may be selected according to the manner for sequencing the network addresses of the candidate P2P nodes corresponding to all network addresses supported by the first P2P node in the information list.

In the solution, the method may further include the following operations.

When the service content is required to be acquired from at least two candidate P2P nodes, network addresses of the at least two candidate P2P nodes are obtained from the information list.

The first P2P node communicates with the at least two P2P nodes based on the acquired network addresses to acquire the service content.

The embodiments of the disclosure also provide a server, which may include a first receiving unit, a determination unit, a generation unit and a first sending unit.

The first receiving unit may be configured to receive a first request from a first P2P node, the first request including a service content.

The determination unit may be configured to determine at least one candidate P2P node for the first P2P node using position information of the first P2P node in different network layers and the service content, the at least one candidate P2P node being capable of providing service to the first P2P node and the position information being position information generated based on a network topology structure.

The generation unit may be configured to generate a candidate P2P node information list using the at least one candidate P2P node, P2P node information in the information list representing a transmission distance between the at least one candidate P2P node and the first P2P node.

The first sending unit may be configured to return the information list to the first P2P node.

In the solution, the determination unit may be configured to determine the at least one candidate P2P node for the first P2P node using at least one network address supported by the first P2P node and the service content.

In the solution, the determination unit may be configured to:

for each network address supported by the first P2P node, determine at least one P2P node capable of providing the service to the first P2P node based on the service content; and select the P2P node of which a transmission distance with the first P2P node is shortest from the determined at least one P2P node as a candidate P2P node corresponding to said each network address.

The generation unit may be configured to:

for each network address supported by the first P2P node, write a network address of the candidate P2P node corresponding to said each network address into the information list.

Each network address of the first P2P node and the network address of the corresponding candidate P2P node may be network addresses in a same network layer.

In the solution, the generation unit may further be configured to sequence, in the information list, network addresses of candidate P2P nodes corresponding to all network addresses supported by the first P2P node according to a manner of sequencing in ascending order of transmission distances between the candidate P2P nodes and the first P2P node.

In the solution, the server may further include a first acquisition unit.

The first acquisition unit may be configured to, responsive to learning that the first P2P node is on line, acquire the position information of the first P2P node from a network topology information management device.

The embodiments of the disclosure also provide a first P2P node, which may include a second sending unit, a second receiving unit, a selection unit and a second acquisition unit.

The second sending unit may be configured to send a first request to a server, the first request including a service content and the first request being configured to request the server for an information list indicating candidate P2P nodes capable of providing the service content.

The second receiving unit may be configured to receive the information list returned by the server, P2P node information in the information list representing a transmission distance between at least one candidate P2P node and the first P2P node.

The selection unit may be configured to select a second P2P node from the information list according to the information list, the second P2P node being capable of providing service to the first P2P node.

The second acquisition unit may be configured to acquire the service content from the second P2P node for presentation.

In the solution, the information list may include a network address of the candidate P2P node corresponding to each network address supported by the first P2P node; and each network address of the first P2P node and the network address of the corresponding candidate P2P node may be network addresses in a same network layer.

The selection unit may be configured to select the second P2P node according to the network address of the candidate P2P node corresponding to each network address.

Correspondingly, communication may be performed with the second P2P node using a network address of the second P2P node to acquire the service content.

In the solution, the selection unit may further be configured to, when the service content is required to be acquired from at least two candidate P2P nodes, obtain network addresses of the at least two candidate P2P nodes from the information list.

The second acquisition unit may be configured to communicate with the at least two P2P nodes based on the acquired network addresses to acquire the service content.

The embodiments of the disclosure also provide a computer-readable storage medium, in which a computer program may be stored, the computer program being executed by a processor to implement the steps of any method for a server side or implement the steps of any method for a first P2P node side.

According to the scheduling method, server, first P2P node and computer-readable storage medium provided in the embodiments of the disclosure, the server receives the first request from the first P2P node, the first request including the service content, determines the at least one candidate P2P node for the first P2P node using the position information of the first P2P node in different network layers and the service content, the at least one candidate P2P node being capable of providing the service to the first P2P node and the position information being position information generated based on the network topology structure, generates the candidate P2P node information list using the at least one candidate P2P node, the P2P node information in the information list representing the transmission distance between the at least one P2P node and the first P2P node, and returns the information list to the first P2P node; and the first P2P node selects the second P2P node from the information list according to the information list, the second P2P node being capable of providing the service to the first P2P node, and acquires the service content from the second P2P node for presentation, and the candidate P2P node is scheduled for the first P2P node using the position information of the first P2P node in different network regions. In such a manner, accuracy of determining transmission distances (route skipping distances) between P2P nodes may be improved, so that a transmission delay may be effectively reduced.

BRIEF DESCRIPTION OF DRAWINGS

In the drawings (which are not always drawn to scale), similar drawing reference signs may describe similar components in different views. The drawings illustrate each embodiment discussed in the disclosure exemplarily and unrestrictedly.

DETAILED DESCRIPTION

The disclosure will further be described below in combination with the drawings and embodiments in detail.

Figure 1:
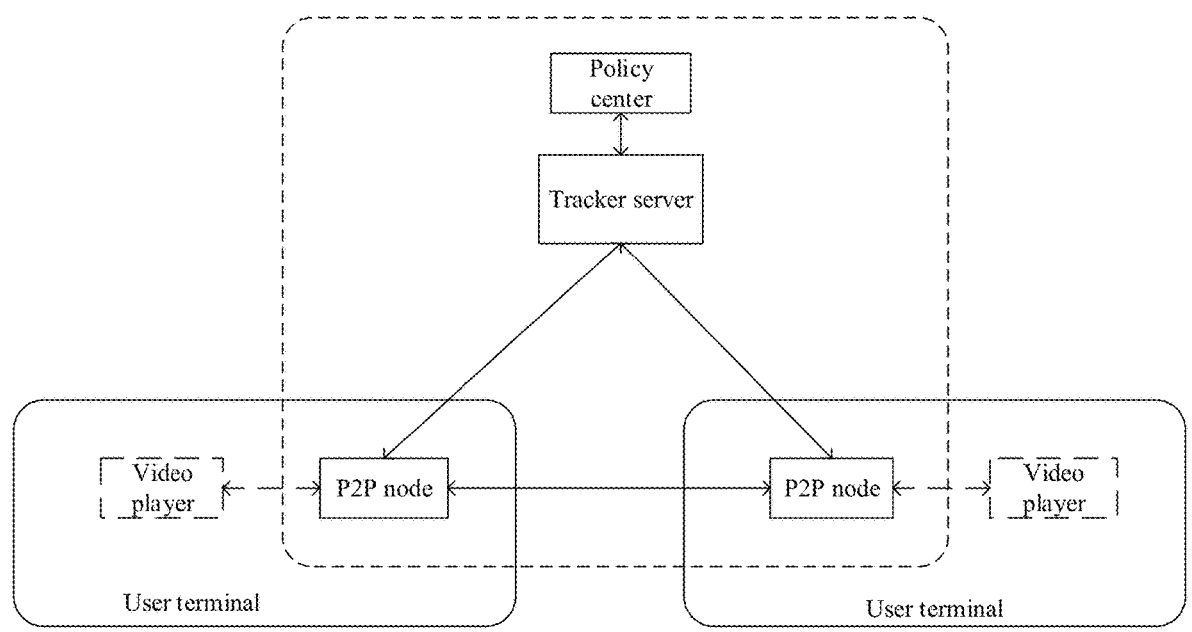
FIG. 1 is an architecture diagram of a P2P CDN system according to a related art.

FIG. 1 is an architecture diagram of a P2P CDN system. From FIG. 1, it can be seen that the P2P CDN system mainly includes a policy center and a tracker server. Herein, the policy center provides a configuration function for each policy involved in the P2P CDN system, including content pre-pushing policy management and tracker scheduling policy management.

The tracker server realizes a global control and scheduling function of the P2P CDN system and is a unified entry server for access of a terminal user. The tracker server maintains IP addresses and port number information of all downloaders of a file. After a set-top box terminal P2P node is started and in an idle state, the tracker server periodically pre-pushes contents and, when certain user equipment requests for acquiring a certain video content, returns a P2P node list capable of providing delivery service for the content.

In the related art, a service flow through which a user acquires video content service in the P2P CDN system includes the following steps.

In A, a user X selects a certain video program A expected to be watched through a video player on a device such as a Personal Computer (PC) or a set-top box and, meanwhile, a P2P node X is registered on the tracker server and notifies the server that it has been on line.

In B, the P2P node X (serving as a receiver of the video service at present) of the user X requests the tracker server for a list of other P2P nodes (video service providers) capable of providing delivery service for the present content A.

In C, the tracker server (a scheduling center), after receiving the request from the P2P node X, returns an information list of a plurality of candidate P2P nodes capable of providing the service for it to the P2P node X in combination with P2P node information (whether the P2P nodes store the content A and have service capabilities or not and the like) acquired by it and information about distances between these P2P nodes and the P2P node X. Information about each P2P node in the list includes an IP address (essential) and port information (optional) and the like of the P2P node.

In D, the P2P node X is connected to another P2P node according to the P2P node information list to request for acquiring a data fragment of the video content to obtain the video content service and, after acquiring the video content, plays the video content for the user.

From the above descriptions, it can be seen that, for generating the information list in C, the tracker server is required to accurately judge the P2P node of which the distance with the P2P node X is shortest as much as possible. Herein, the condition that the distance is shortest refers to that a data transmission delay when the other P2P node provides content delivery service for the P2P node X is shortest. The delay includes transmission durations of other network devices through which data is sent and durations required by data forwarding of these network devices.

In general, under the condition that a network topology structure is not mastered, a P2P operating company may speculate distances between P2P nodes at first according to similarities of network addresses of different P2P nodes and then verifies and monitors actual magnitudes of the distances (delay magnitudes) in a manner of transmitting test data between the P2P nodes. However, when the network operating company allocates IP addresses for network access devices of a user (a home gateway and devices connected therewith, for example, a PC and a set-top box), since the number of IP addresses is limited, private IP addresses may be allocated for all gateway devices in a specific region (for example, in a local metropolitan area network of a certain urban region or under a certain BRAS device), and these gateway devices externally share a few public IP addresses through a Network Address Translation (NAT) technology.

As a consequence, when the abovementioned solution is adopted, a method by which the P2P operating company speculates distances between different nodes is not so accurate. This is because: when different IP addresses are allocated for each region to use through the NAT technology, the addresses are not fragmented regularly and, in such case, similarities between the addresses do not always represent distances between the addresses; a relatively long time is required by the verification manner of transmitting the test data and a data transmission overhead of the network is increased; and methods of monitoring the actual magnitudes of the distances (the delay magnitudes) and the like may be executed only after data transmission is started and are relatively low in efficiency.

In addition, when the abovementioned solution is adopted, the network access devices of the user, when running P2P applications and providing service for one another as P2P nodes, may communicate with one another only with the public IP address. Therefore, two devices, even though belonging to the same Optical Line Terminal (OLT) or BRAS device, are also required to be routed roundabout to the OLT or the BRAS device for mutual communication, which increases a transmission routing distance (transmission cost) and the delay.

On such a basis, in various embodiments of the disclosure: a server receives a first request from a first P2P node, the first request including a service content, determines at least one candidate P2P node for the first P2P node using position information of the first P2P node in different network layers and the service content, the at least one candidate P2P node being capable of providing service to the first P2P node and the position information being position information generated based on a network topology structure, generates a candidate P2P node information list using the at least one candidate P2P node, P2P node information in the information list representing a transmission distance between the at least one candidate P2P node and the first P2P node, and returns the information list to the first P2P node; and the first P2P node selects a second P2P node from information list according to the information list, the second P2P node being capable of providing the service to the first P2P node, and acquires the service content from the second P2P node for presentation.

Figure 2:
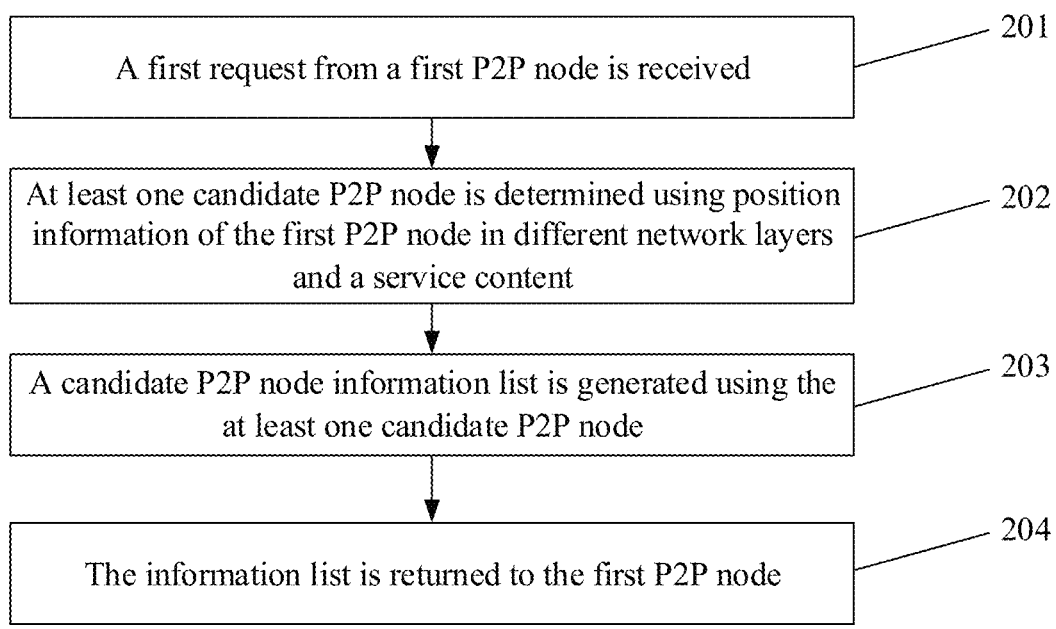
FIG. 2 is a flowchart of a scheduling method for a server side according to an embodiment of the disclosure.

The embodiments of the disclosure also provide a scheduling method, applied to a server, which may specifically be a tracker server. As shown in FIG. 2, the method includes the following steps.

In 201, a first request from a first P2P node is received.

Herein, the first request includes a service content.

The service content may be a multimedia content, for example, a video content.

In an embodiment, before the step is executed, the method may further include the following operation.

Responsive to learning that the first P2P node is on line, position information of the first P2P node is acquired from a network topology information management device.

During a practical application, the network topology information management device may be an existing network routing device in a network, for example, a router, a layer-2 switch or a NAT device, and may also be a newly added device capable of obtaining network topology information.

In 202, at least one candidate P2P node is determined for the first P2P node using the position information of the first P2P node in different network layers and the service content.

Herein, the at least one candidate P2P node may provide service to the first P2P node. The position information is position information generated based on a network topology structure.

Herein, the server has acquired information about each P2P node in advance, including the stored content, a service capability and the like. The server accordingly determines the candidate P2P node for the first P2P node.

When an operating company develops a P2P service, network access devices, which belong to the same OLT or use the same NAT device and for which private network addresses are allocated, of a user may be set to be routed through local addresses (the private network addresses) under the device according to the network topology structure mastered by the operating company and a network configuration capability. In such case, data therebetween may be forwarded through routing of the device and they may also access one another through the private network addresses to achieve a purpose of minimizing transmission delays during mutual access through the private network addresses.

Therefore, during the practical application, the position information of the first P2P node in different network layers may be represented by network addresses in different network layers.

These network addresses are network addresses of the first P2P node in different network layer protocols. These network addresses may include a public network address, a private network device under a NAT device, layer-2 intranet addresses and layer-3 intranet addresses under different devices and the like. The position information of the first P2P node in different network layers may be learned about according to different network addresses.

On such a basis, the step may specifically be implemented by the following operation.

The at least one candidate P2P node is determined for the first P2P node using at least one network address supported by the first P2P node and the service content.

More specifically, for each network address supported by the first P2P node, the server determines at least one P2P node capable of providing the service to the first P2P node based on the service content.

The server selects the P2P node of which a transmission distance (route skipping distance) with the first P2P node is shortest from the determined at least one P2P node as a candidate P2P node corresponding to said each network address.

Herein, the transmission distance refers to a cost index of data transmission between two network positions. During the practical application, factors such as a transmission delay between the network positions, a link bandwidth, a traffic charge, a traffic engineering policy and the like should be comprehensively considered for the index.

In 203, a candidate P2P node information list is generated using the at least one candidate P2P node.

Herein, P2P node information in the information list represents a transmission distance between at least one candidate P2P node and the first P2P node.

When the network addresses in different network layers are adopted to represent the position information of the first P2P node in different network layers and the information list is generated, the server, for each network address supported by the first P2P node, writes a network address of the candidate P2P node corresponding to said each network address into the information list.

Each network address of the first P2P node and the network address of the corresponding candidate P2P node are network addresses in a same network layer.

During the practical application, the server sequences, in the information list, the network addresses of the candidate P2P nodes corresponding to all network addresses supported by the first P2P node according to a manner of sequencing in ascending order of transmission distances between the candidate P2P nodes and the first P2P node, so that the first P2P node may select the corresponding candidate P2P node according to the sequencing manner.

During the practical application, an information representation manner in the embodiment of the disclosure that the P2P node information in the generated candidate P2P node information list in the embodiment of the disclosure represents the transmission distance between the at least one candidate P2P node and the first P2P node may be explicitly indicated and may also be implied. Correspondingly, provided information about the transmission distance may be explicit or specific and may also be relative or obscure. The implied information representation manner and the manner of providing relative or obscure transmission distance information include, but not limited to, that: the specific candidate P2P node of which the transmission distance with the first P2P node is relatively shorter or longer is determined according to a sequence of multiple P2P nodes in the P2P node information list; or, the candidate P2P node in the P2P node information list has been screened according to a predetermined transmission distance related screening standard, so that the objective condition that a certain P2P node is listed in the P2P node information list represents information about that the transmission distance of the P2P node is consistent with the predetermined transmission distance related screening standard and the P2P node may be determined as a candidate.

In 204, the information list is returned to the first P2P node.

Figure 3:
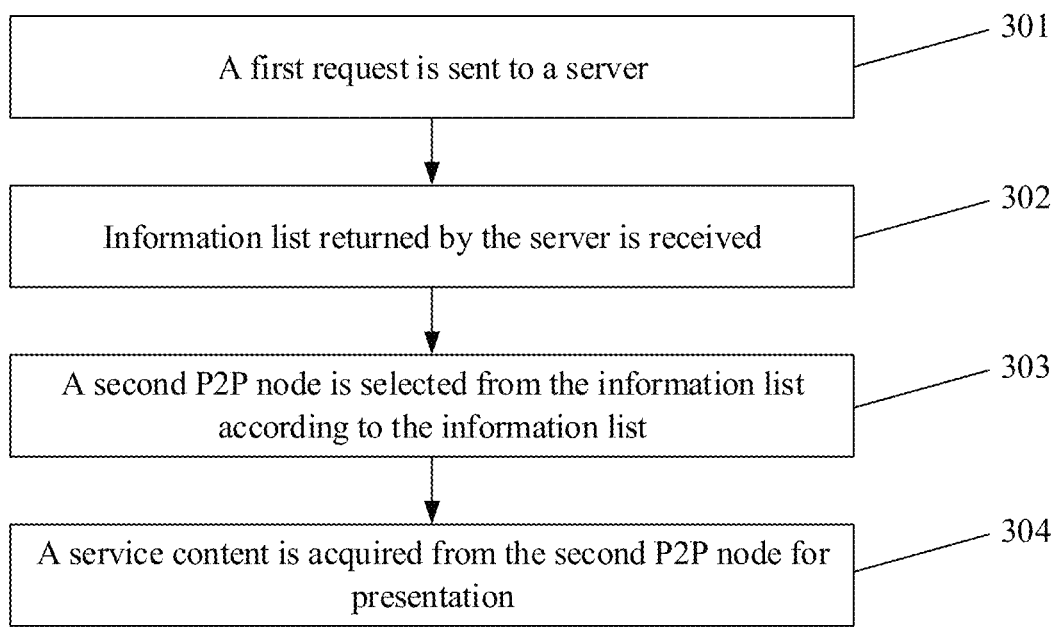
FIG. 3 is a flowchart of a scheduling method for a first P2P node side according to an embodiment of the disclosure.

Correspondingly, the embodiments of the disclosure also provide a scheduling method, which is applied to a first P2P node. As shown in FIG. 3, the method includes the following steps.

In 301, a first request is sent to a server.

Herein, the first request includes a service content. The first request is configured to request the server for an information list indicating candidate P2P nodes capable of providing the service content.

In 302, the information list returned by the server is received.

Herein, P2P node information in the information list represents a transmission distance (route skipping distance) between at least one candidate P2P node and the first P2P node.

Herein, the transmission distance refers to a cost index of data transmission between two network positions. During the practical application, factors such as a transmission delay between the network positions, a link bandwidth, a traffic charge, a traffic engineering policy and the like should be comprehensively considered for the index.

In 303, a second P2P node is selected from the information list according to the information list.

Herein, the second P2P node may provide service to the first P2P node and may be a candidate P2P node of which the transmission distance with the first P2P node is shortest. Of course, the second P2P node may also be one of multiple candidate P2P nodes of which the transmission distances are relatively short.

When an operating company develops a P2P service, network access devices, which belong to the same OLT or use the same NAT device and for which private network addresses are allocated, of a user may be set to be routed through local addresses (the private network addresses) under the device according to the network topology structure mastered by the operating company and a network configuration capability. In such case, data therebetween may be forwarded through routing of the device and they may also access one another through the private network addresses to achieve a purpose of minimizing transmission delays during mutual access through the private network addresses.

Therefore, during a practical application, the transmission distance between the candidate P2P node and the first P2P node may be represented by network addresses in different network layers.

These network addresses are network addresses of the first P2P node in different network layer protocols. These network addresses may include a public network address, a private network device under a NAT device, layer-2 intranet addresses and layer-3 intranet addresses under different devices and the like. Position information of the first P2P node in different network layers may be learned about according to different network addresses.

On such a basis, in an embodiment, the information list includes a network address of the candidate P2P node corresponding to each network address supported by the first P2P node; and each network address of the first P2P node and the network address of the corresponding candidate P2P node are network addresses in a same network layer.

The first P2P node selects the second P2P node according to the network address of the candidate P2P node corresponding to each network address.

Correspondingly, the first P2P node communicates with the second P2P node using a network address of the second P2P node to execute 304, namely acquiring the service content.

In addition, during the practical application, a manner for sequencing the network addresses of the candidate P2P nodes corresponding to all network addresses supported by the first P2P node in the information list is a manner of sequencing in ascending order of transmission distances between the candidate P2P nodes and the first P2P node.

Correspondingly, the first P2P node selects the second P2P node according to the manner for sequencing the network addresses of the candidate P2P nodes corresponding to all network addresses supported by the first P2P node in the information list.

In 304, the service content is acquired from the second P2P node for presentation.

During the practical application, when the service content is required to be acquired from at least two candidate P2P nodes, the first P2P node may obtain network addresses of the at least two candidate P2P nodes from the information list.

The first P2P node communicates with the at least two P2P nodes based on the acquired network addresses to acquire the service content.

Therefore, purposes of optimizing a transmission route, reducing a burden of a network device and shortening a transmission delay may be achieved.

According to the scheduling methods provided in the embodiments of the disclosure, the server receives the first request from the first P2P node, the first request including the service content, determines the at least one candidate P2P node for the first P2P node using the position information of the first P2P node in different network layers and the service content, the at least one candidate P2P node being capable of providing the service to the first P2P node and the position information being position information generated based on the network topology structure, generates the candidate P2P node information list using the at least one candidate P2P node, the P2P node information in the information list representing the transmission distance between the at least one P2P node and the first P2P node, and returns the information list to the first P2P node; and the first P2P node selects the second P2P node from the information list according to the information list, the second P2P node being capable of providing the service to the first P2P node, and acquires the service content from the second P2P node for presentation, and the candidate P2P node is scheduled for the first P2P node using the position information of the first P2P node in different network regions. In such a manner, accuracy of determining transmission distances (route skipping distances) between P2P nodes may be improved, so that a transmission delay may be effectively reduced.

Based on the abovementioned embodiments, a P2P node scheduling process will be described in detail in an application embodiment.

Figure 4:
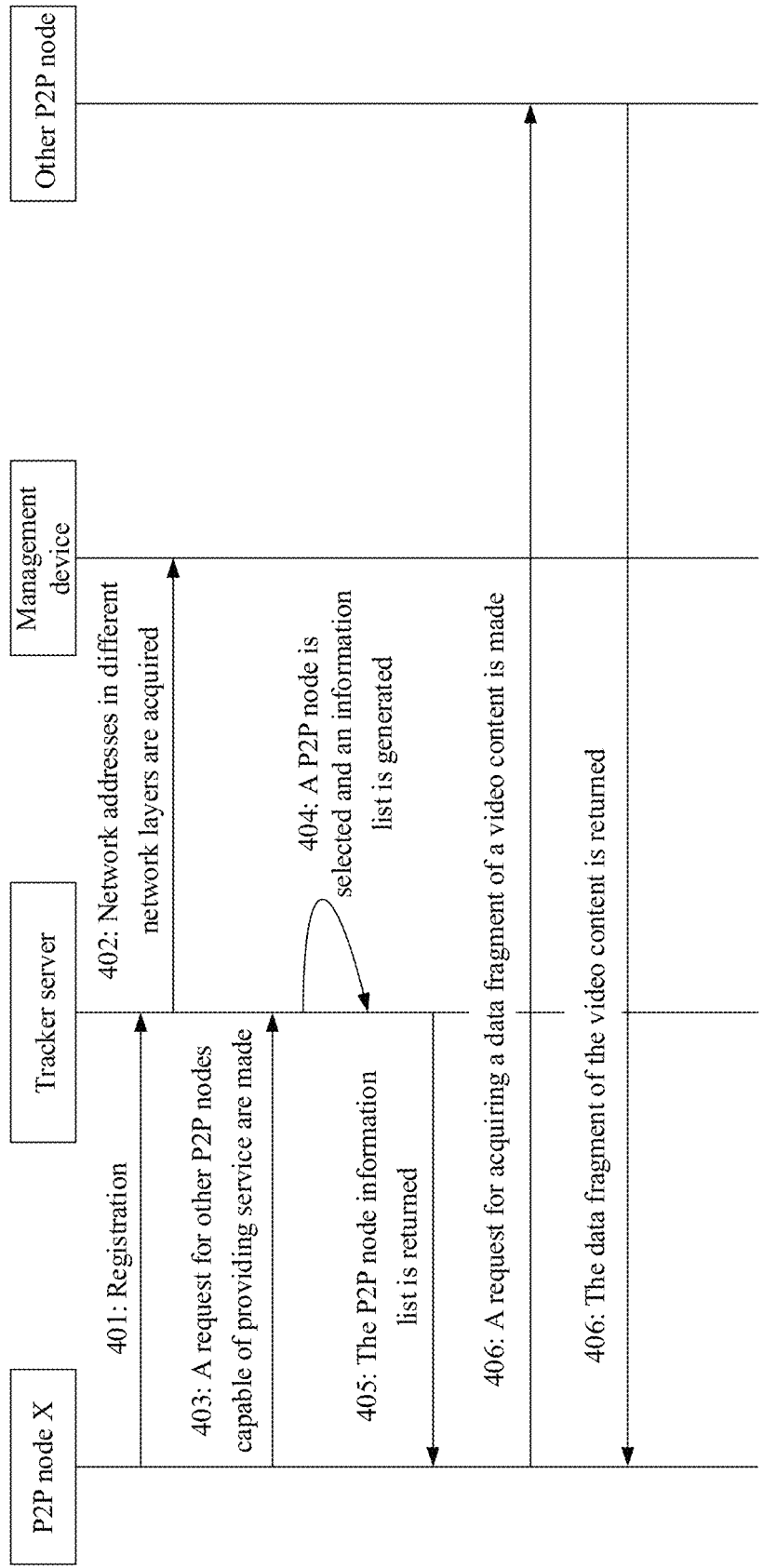
FIG. 4 is a flowchart of a P2P node scheduling method according to an embodiment of the disclosure.

A P2P node scheduling method of the application embodiment, as shown in FIG. 4, includes the following steps.

In 401, a user X selects a certain video program A expected to be watched through a video player on a device such as a PC or a set-top box and, meanwhile, a P2P node X is registered on a tracker server and notifies the tracker server that it has been on line.

In 402, after registration, the tracker server acquires network addresses supported by the P2P node X in different network layers and regions where each address is located from a network topology information management device according to address information of the P2P node X.

Herein, these network addresses are network addresses of the first P2P node in different network layer protocols. These network addresses may include a public network address, a private network device under a NAT device, layer-2 intranet addresses and layer-3 intranet addresses under different devices and the like.

In 403, the P2P node X (serving as a receiver of the video service at present) of the user X requests the tracker server for a list of other P2P nodes (video service providers) capable of providing delivery service to the present content A.

In 404, the tracker server (a scheduling center), after receiving the request from the P2P node X, for different network addresses supported by the P2P node X, calculates the P2P nodes capable of serving the P2P node X in a space of each network address in combination with P2P node information (whether the P2P nodes store the content A and have service capabilities or not and the like) acquired by it and information about transmission distances between these P2P nodes and the P2P node X, selects the P2P node of which the transmission distance with the P2P node X is shortest as a P2P node corresponding to said each network address and writes a network address of the selected P2P node into the information list. Therefore, the information list includes network addresses of P2P nodes for different network addresses supported by the P2P node X.

For example, there is made such a hypothesis that the network addresses supported by the P2P node X include the public network address, the private network address under the NAT device, and the layer-2 intranet addresses and layer-3 intranet addresses under different devices.

Then, for the public network address, the P2P node of which the transmission distance is shortest is selected as a P2P node corresponding to the public network address and a network address (public network address) of the selected P2P node is written into the information list.

For the private network address under the NAT device, the P2P node of which the transmission distance is shortest is selected as a P2P node corresponding to the private network address and a network address (private network address) of the selected P2P node is written into the information list.

For a layer-2 intranet address, the P2P node of which the transmission distance is shortest is selected as a P2P node corresponding to the layer-2 intranet address and a network address (layer-2 intranet address) of the selected P2P node is written into the information list.

For a layer-3 intranet address, the P2P node of which the transmission distance is shortest is selected as a P2P node corresponding to the layer-3 intranet address and a network address (layer-3 intranet address) of the selected P2P node is written into the information list.

From the above descriptions, it can be seen that the condition that the transmission distance is shortest may refer to that the P2P node is neighboring in terms of routing distance, the routing distance is shortest and a data transmission delay is shortest.

Herein, the transmission distance refers to a cost index of data transmission between two network positions. During the practical application, factors such as a transmission delay between the network positions, a link bandwidth, a traffic charge, a traffic engineering policy and the like should be comprehensively considered for the index.

In addition, a sequence of various types of addresses from long to short transmission distance in the information list (i.e., a sequencing manner for each candidate P2P node) is: the public network address, the private network address under the NAT device, the layer-2 intranet address and the layer-3 intranet address.

Herein, reach P2P node in the list has the network address of the P2P node and may also include port information (optional) and the like.

In 405, an information list of a plurality of candidate P2P nodes capable of providing the service for it is returned to the P2P node X.

In 406, the P2P node is connected to another P2P node according to the P2P node information list to request for acquiring a data fragment of the video content to obtain the video content service and, after acquiring the video content, plays the video content for the user.

Herein, the P2P node X, when communicating with each P2P node serving as a serving node, adopts the network address representing the shortest transmission distance for communication.

In addition, the P2P node X may also concurrently communicate with different P2P nodes to obtain the video content and, in such case, may adopt different network addresses and respective routes respectively, so that a transmission route is further optimized, a burden of a network device is reduced and a transmission delay is shortened.

Figure 5:
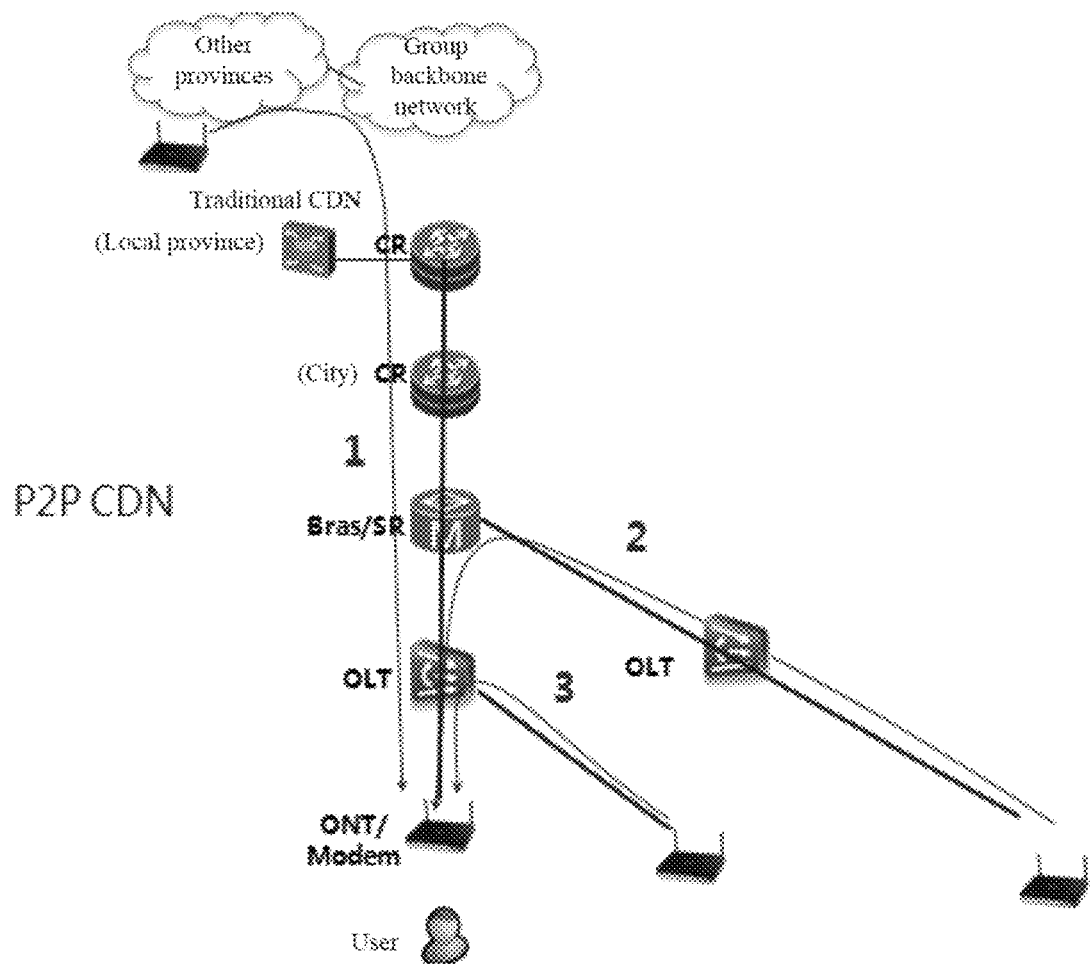
FIG. 5 is a schematic diagram of a network topology structure and a routing path according to an embodiment of the disclosure.

When the solution of the embodiment of the disclosure is adopted, under a network topology structure shown in FIG. 5, the user, after scheduling of the tracker server, may obtain the video content through a routing path 1 and, in this process, a network address used for communication is the public network address. The user may also obtain the video content through a routing path 2 and, in this process, the address used for communication is the private network address under the NAT device. The user may also obtain the video content through a routing path 3 and, in this process, the address used for communication is the layer-2 intranet address under an OLT. The user may select different routing paths to acquire the video content according to a requirement (network signal strength, a length of the routing path, a connection establishment condition and the like).

From the above, in the embodiment of the disclosure, the tracker server calculates the transmission distance with each other P2P node in each distance space according to the distance spaces of different network addresses supported by the P2P node (the public network address, the private network address under the NAT device, the layer-3 and layer-2 intranet addresses under different devices and the like) and accordingly optimizes a route scheduling mechanism to select an optimal route for video data transmission between different P2P nodes to implement scheduling management over each P2P node according to different address distance spaces to which they probably belong respectively.

Specifically, in the P2P scheduling process, for the network topology structure, different transmission distances are planned for each P2P node according to positions thereof (a public network address, a private network address under a NAT device, layer-3 and layer-2 intranet addresses under different devices and the like) in different network layers and transmission distances between different P2P nodes are accordingly estimated to guide a P2P scheduling mechanism.

When content data is acquired between P2P nodes, the network address corresponding to the shortest transmission distance is used for communication between different P2P nodes, and different network addresses and respective routes are used to shorten the transmission delay.

With adoption of the solution of the embodiment of the disclosure, a content transmission path between a local P2P node and an opposite P2P node may be determined according to the network topology structure and a position of the opposite P2P node, so that accuracy of determining a routing distance is improved, various routing transmission paths are further flexibly provided for the same P2P node, the transmission route is optimized and the burden of the network device is reduced.

In addition, an optimal P2P transmission path is selected according to spatial positions of two P2P nodes in a network topology or different spatial distances, so that the transmission delay is shortened, a user experience is improved and a network transmission bandwidth is reduced.

Figure 6:
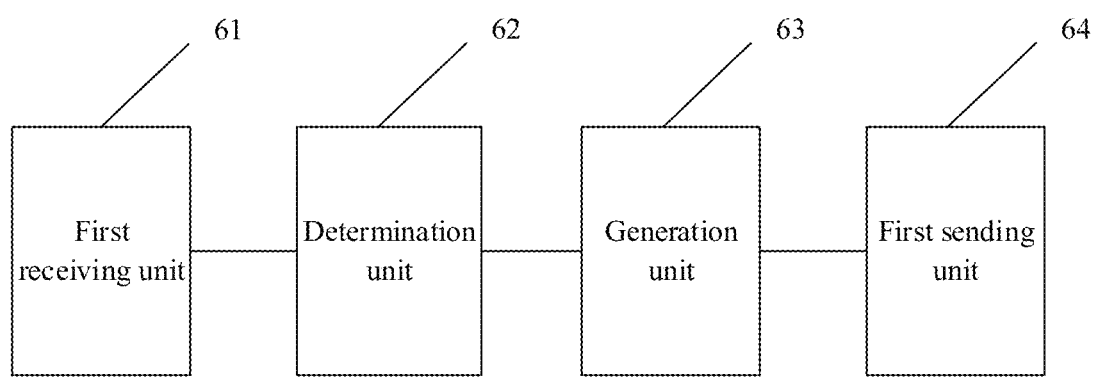
FIG. 6 is a structure diagram of a server according to an embodiment of the disclosure.

For implementing the method of the embodiments of the disclosure, the embodiments of the disclosure provide a server, which is specifically a tracker server. As shown in FIG. 6, the server includes a first receiving unit 61, a determination unit 62, a generation unit 63 and a first sending unit 64.

The first receiving unit 61 is configured to receive a first request from a first P2P node, the first request including a service content.

The determination unit 62 is configured to determine at least one candidate P2P node for the first P2P node using position information of the first P2P node in different network layers and the service content, the at least one candidate P2P node being capable of providing service to the first P2P node and the position information being position information generated based on a network topology structure.

The generation unit 63 is configured to generate a candidate P2P node information list using the at least one candidate P2P node, P2P node information in the information list representing a transmission distance between the at least one candidate P2P node and the first P2P node.

The first sending unit 64 is configured to return the information list to the first P2P node.

The service content may be a multimedia content, for example, a video content.

In an embodiment, the server may further include a first acquisition unit.

The first acquisition unit is configured to, responsive to learning that the first P2P node is on line, acquire the position information of the first P2P node from a network topology information management device.

During a practical application, the network topology information management device may be an existing network routing device in a network, for example, a router, a layer-2 switch or a NAT device, and may also be a newly added device capable of obtaining network topology information.

The server has acquired information about each P2P node in advance, including the stored content, a service capability and the like. The determination unit 62 accordingly determines the candidate P2P node for the first P2P node.

When an operating company develops a P2P service, network access devices, which belong to the same OLT or use the same NAT device and for which private network addresses are allocated, of a user may be set to be routed through local addresses (the private network addresses) under the device according to the network topology structure mastered by the operating company and a network configuration capability. In such case, data therebetween may be forwarded through routing of the device and they may also access one another through the private network addresses to achieve a purpose of minimizing transmission delays during mutual access through the private network addresses.

Therefore, during the practical application, the position information of the first P2P node in different network layers may be represented by network addresses in different network layers.

These network addresses are network addresses of the first P2P node in different network layer protocols. These network addresses may include a public network address, a private network device under a NAT device, layer-2 intranet addresses and layer-3 intranet addresses under different devices and the like. The position information of the first P2P node in different network layers may be learned about according to different network addresses.

On such a basis, the determination unit 62 is specifically configured to:

determine the at least one candidate P2P node for the first P2P node using at least one network address supported by the first P2P node and the service content.

More specifically, for each network address supported by the first P2P node, the determination unit 62 determines at least one P2P node capable of providing the service to the first P2P node based on the service content.

The determination unit 62 selects the P2P node of which a transmission distance (route skipping distance) with the first P2P node is shortest from the determined at least one P2P node as a candidate P2P node corresponding to said each network address.

Correspondingly, the generation unit 63 is specifically configured to:

for each network address supported by the first P2P node, write a network address of the candidate P2P node corresponding to said each network address into the information list.

Each network address of the first P2P node and the network address of the corresponding candidate P2P node are network addresses in a same network layer.

Herein, the transmission distance refers to a cost index of data transmission between two network positions. During the practical application, factors such as a transmission delay between the network positions, a link bandwidth, a traffic charge, a traffic engineering policy and the like should be comprehensively considered for the index.

During the practical application, the generation unit 63 is further configured to sequence, in the information list, network addresses of candidate P2P nodes corresponding to all network addresses supported by the first P2P node according to a manner of sequencing in ascending order of transmission distances between the candidate P2P nodes and the first P2P node, so that the first P2P node may select the corresponding candidate P2P node according to the sequencing manner.

During the practical application, an information representation manner in the embodiment of the disclosure that the P2P node information in the generated candidate P2P node information list in the embodiment of the disclosure represents the transmission distance between the at least one candidate P2P node and the first P2P node may be explicitly indicated and may also be implied. Correspondingly, provided information about the transmission distance may be explicit or specific and may also be relative or obscure. The implied information representation manner and the manner of providing relative or obscure transmission distance information include, but not limited to, that: the specific candidate P2P node of which the transmission distance with the first P2P node is relatively shorter or longer is determined according to a sequence of multiple P2P nodes in the P2P node information list; or, the candidate P2P node in the P2P node information list has been screened according to a predetermined transmission distance related screening standard, so that the objective condition that a certain P2P node is listed in the P2P node information list represents information about that the transmission distance of the P2P node is consistent with the predetermined transmission distance related screening standard and the P2P node may be determined as a candidate.

It is to be noted that, during the practical application, the first receiving unit 61, the first sending unit 64 and the first acquisition unit may be implemented by a communication chip in the server and the determination unit 62 and the generation unit 63 may be implemented by a processor in the server, for example, a Central Processing Unit (CPU), a Micro Control Unit (MCU), a Digital Signal Processor (DSP) or a Field-Programmable Gate Array (FPGA).

Figure 7:
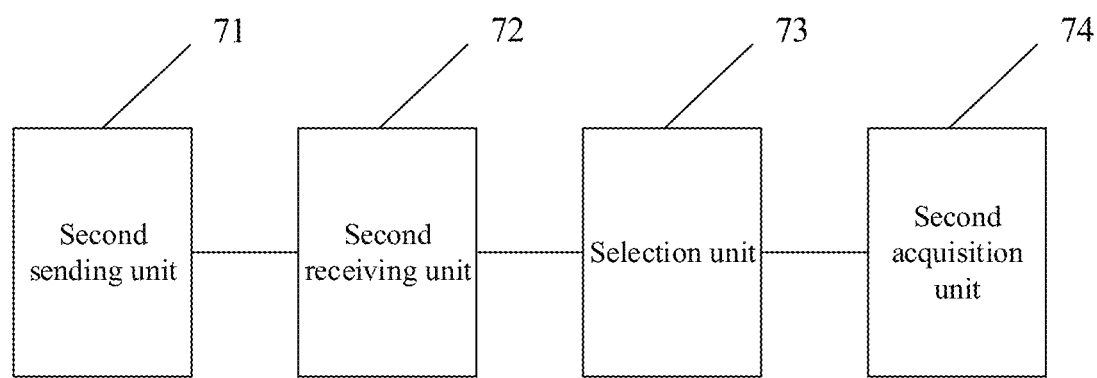
FIG. 7 is a structure diagram of a first P2P node according to an embodiment of the disclosure.

For implementing the method of the embodiments of the disclosure, the embodiments of the disclosure also provide a first P2P node. As shown in FIG. 7, the node includes a second sending unit 71, a second receiving unit 72, a selection unit 73 and a second acquisition unit 74.

The second sending unit 71 is configured to send a first request to a server, the first request including a service content and the first request being configured to request the server for an information list indicating candidate P2P nodes capable of providing the service content.

The second receiving unit 72 is configured to receive the information list returned by the server, P2P node information in the information list representing a transmission distance (route skipping distance) between at least one candidate P2P node and the first P2P node.

The selection unit 73 is configured to select a second P2P node from the information list according to the information list, the second P2P node being capable of providing service to the first P2P node.

The second acquisition unit 74 is configured to acquire the service content from the second P2P node for presentation.

Herein, the transmission distance refers to a cost index of data transmission between two network positions. During the practical application, factors such as a transmission delay between the network positions, a link bandwidth, a traffic charge, a traffic engineering policy and the like should be comprehensively considered for the index.

When an operating company develops a P2P service, network access devices, which belong to the same OLT or use the same NAT device and for which private network addresses are allocated, of a user may be set to be routed through local addresses (the private network addresses) under the device according to the network topology structure mastered by the operating company and a network configuration capability. In such case, data therebetween may be forwarded through routing of the device and they may also access one another through the private network addresses to achieve a purpose of minimizing transmission delays during mutual access through the private network addresses.

Therefore, during a practical application, the transmission distance between the candidate P2P node and the first P2P node may be represented by network addresses in different network layers.

These network addresses are network addresses of the first P2P node in different network layer protocols. These network addresses may include a public network address, a private network device under a NAT device, layer-2 intranet addresses and layer-3 intranet addresses under different devices and the like. Position information of the first P2P node in different network layers may be learned about according to different network addresses.

On such a basis, in an embodiment, the information list includes a network address of the candidate P2P node corresponding to each network address supported by the first P2P node; and each network address of the first P2P node and the network address of the corresponding candidate P2P node are network addresses in a same network layer.

The selection unit 73 is specifically configured to select the second P2P node according to the network address of the candidate P2P node corresponding to each network address.

Correspondingly, the second acquisition unit 74 performs communication with the second P2P node using a network address of the second P2P node to acquire the service content.

During a practical application, the second node may be a candidate P2P node of which the transmission distance with the first P2P node is shortest. The second P2P node may also be one of multiple candidate P2P nodes of which the transmission distances are relatively short and is not always the P2P node of which the transmission distance is shortest.

In addition, during the practical application, a manner for sequencing the network addresses of the candidate P2P nodes corresponding to all network addresses supported by the first P2P node in the information list is a manner of sequencing in ascending order of transmission distances between the candidate P2P nodes and the first P2P node.

Correspondingly, the selection unit 73 selects the second P2P node according to the manner for sequencing the network addresses of the candidate P2P nodes corresponding to all network addresses supported by the first P2P node in the information list.

During the practical application, the selection unit 73 is further configured to, when the service content is required to be acquired from at least two candidate P2P nodes, obtain network addresses of the at least two candidate P2P nodes from the information list.

The second acquisition unit 74 is configured to communicate with the at least two P2P nodes based on the acquired network addresses to acquire the service content.

During the practical application, the second sending unit 71, the second receiving unit 72 and the second acquisition unit 74 may be implemented by a communication chip in the first P2P node and the selection unit 73 may be implemented by a processor in the first P2P node, for example, a CPU, an MCU, a DSP or an FPGA.

According to the solutions provided in the embodiments of the disclosure, the server receives the first request from the first P2P node, the first request including the service content, determines the at least one candidate P2P node for the first P2P node using the position information of the first P2P node in different network layers and the service content, the at least one candidate P2P node being capable of providing the service to the first P2P node and the position information being position information generated based on the network topology structure, generates the candidate P2P node information list using the at least one candidate P2P node, the P2P node information in the information list representing the transmission distance between the at least one P2P node and the first P2P node, and returns the information list to the first P2P node; and the first P2P node selects the second P2P node from the information list according to the information list, the second P2P node being capable of providing the service to the first P2P node, and acquires the service content from the second P2P node for presentation, and the candidate P2P node is scheduled for the first P2P node using the position information of the first P2P node in different network regions. In such a manner, accuracy of determining transmission distances (route skipping distances) between P2P nodes may be improved, so that a transmission delay may be effectively reduced.

Those skilled in the art should know that the embodiment of the disclosure may be provided as a method, a system or a computer program product. Therefore, the disclosure may adopt a form of hardware embodiment, software embodiment or combined software and hardware embodiment. Moreover, the disclosure may adopt a form of computer program product implemented on one or more computer-available storage media (including, but not limited to, a disk memory and an optical memory) including computer-available program codes.

The disclosure is described with reference to flowcharts and/or block diagrams of the method, device (system) and computer program product according to the embodiments of the disclosure. It is to be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of another programmable data processing device to generate a machine, so that a device for realizing a function specified in one flow or multiple flows in the flowcharts and/or one block or multiple blocks in the block diagrams is generated by the instructions executed through the computer or the processor of the other programmable data processing device.

These computer program instructions may also be stored in a computer-readable memory capable of guiding the computer or the other programmable data processing device to work in a specific manner, so that a product including an instruction device may be generated by the instructions stored in the computer-readable memory, the instruction device realizing the function specified in one flow or multiple flows in the flowcharts and/or one block or multiple blocks in the block diagrams.

These computer program instructions may further be loaded onto the computer or the other programmable data processing device, so that a series of operating steps are executed on the computer or the other programmable data processing device to generate processing implemented by the computer, and steps for realizing the function specified in one flow or multiple flows in the flowcharts and/or one block or multiple blocks in the block diagrams are provided by the instructions executed on the computer or the other programmable data processing device.

On such a basis, the embodiments of the disclosure also provide a computer-readable storage medium, in which a computer program is stored, the computer program being executed by a processor to implement the steps of any method for a server side.

Of course, the embodiments of the disclosure also provide a computer-readable storage medium, in which a computer program is stored, the computer program being executed by a processor to implement the steps of any method for a first P2P node side.

During the practical application, the computer-readable storage medium may be a memory such as a Ferromagnetic Random Access Memory (FRAM), a Read-Only Memory (ROM), a Programmable Read-Only Memory (PROM), an Erasable PROM (EPROM), an Electrically EPROM (EEPROM), a flash memory, a magnetic surface memory, a compact disc or a Compact Disc Read-Only Memory (CD-ROM).

The above is only the preferred embodiment of the disclosure and not intended to limit the scope of protection of the disclosure.

INDUSTRIAL APPLICABILITY

According to the solutions provided in the embodiments of the disclosure, the server receives the first request from the first P2P node, the first request including the service content, determines the at least one candidate P2P node for the first P2P node using the position information of the first P2P node in different network layers and the service content, the at least one candidate P2P node being capable of providing the service to the first P2P node and the position information being position information generated based on the network topology structure, generates the candidate P2P node information list using the at least one candidate P2P node, the P2P node information in the information list representing the transmission distance between the at least one P2P node and the first P2P node, and returns the information list to the first P2P node; and the first P2P node selects the second P2P node from the information list according to the information list, the second P2P node being capable of providing the service to the first P2P node, and acquires the service content from the second P2P node for presentation, and the candidate P2P node is scheduled for the first P2P node using the position information of the first P2P node in different network regions. In such a manner, accuracy of determining transmission distances (route skipping distances) between P2P nodes may be improved, so that a transmission delay may be effectively reduced.

The invention claimed is:

1. A scheduling method, applied to a server, the method comprising:
receiving a first request from a first Peer to Peer (P2P) node, the first request comprising a service content;
determining at least one candidate P2P node for the first P2P node using position information of the first P2P node in different network layers and the service content, the at least one candidate P2P node being capable of providing service to the first P2P node and the position information being position information generated based on a network topology structure;

generating a candidate P2P node information list using the at least one candidate P2P node, P2P node information in the information list representing a transmission distance between the at least one candidate P2P node and the first P2P node, wherein the transmission distance is a cost index of data transmission between two network positions, and the cost index comprises: a transmission delay between the two network positions, a link bandwidth, a traffic charge, and a traffic engineering policy; and returning the information list to the first P2P node, wherein the position information of the first P2P node in different network layers is represented by network addresses in different network layers, the network addresses are network addresses of the first P2P node in different network layer protocols and comprise: a public network address, a private network address under a Network Address Translation (NAT) device, layer-2 intranet addresses under different devices, and layer-3 intranet addresses under different devices; wherein a transmission distance between the first node and the at least one candidate P2P node in a layer of public network address is longer than a transmission distance between the first node and the at least one candidate P2P node in a layer of private network address under the NAT device, which is longer than a transmission distance between the first node and the at least one candidate P2P node in a layer of layer-2 intranet address, which is longer than a transmission distance between the first node and the at least one candidate P2P node in a layer of layer-3 intranet address; and said determining the at least one candidate P2P node for the first P2P node using the position information of the first P2P node in different network layers and the service content comprises:

for each network address supported by the first P2P node, determining at least one P2P node capable of providing the service to the first P2P node based on the service content, and selecting the P2P node of which a transmission distance with the first P2P node is shortest from the determined at least one P2P node as a candidate P2P node corresponding to said each network address.

2. The method of claim 1, wherein when the information list is generated, the method further comprises:

for each network address supported by the first P2P node, writing a network address of the candidate P2P node corresponding to said each network address into the information list, wherein each network address of the first P2P node and the network address of the corresponding candidate P2P node are network addresses in a same network layer.

3. The method of claim 2, wherein when the information list is generated, the method further comprises:

sequencing, in the information list, network addresses of candidate P2P nodes corresponding to all network addresses supported by the first P2P node according to a manner of sequencing in ascending order of transmission distances between the candidate P2P nodes and the first P2P node.

4. The method of claim 3, further comprising: before receiving the first request from the first P2P node, responsive to learning that the first P2P node is on line, acquiring the position information of the first P2P node from a network topology information management device.

5. The method of claim 2, further comprising: before receiving the first request from the first P2P node, responsive to learning that the first P2P node is on line, acquiring the position information of the first P2P node from a network topology information management device.

6. The method of claim 1, further comprising: before receiving the first request from the first P2P node, responsive to learning that the first P2P node is on line, acquiring the position information of the first P2P node from a network topology information management device.

7. A scheduling method, applied to a first Peer to Peer (P2P) node, the method comprising:

sending a first request to a server to enable the server to determine at least one P2P node capable of providing service to the first P2P node based on a service content for each network address supported by the first P2P node, and to enable the server to select the P2P node of which a transmission distance with the first P2P node is shortest from the determined at least one P2P node as a candidate P2P node corresponding to said each network address, the first request comprising the service content and the first request being configured to request the server for an information list indicating candidate P2P nodes capable of providing the service content;

receiving the information list returned by the server, P2P node information in the information list representing a transmission distance between at least one candidate P2P node and the first P2P node, wherein the transmission distance is a cost index of data transmission between two network positions, and the cost index comprises: a transmission delay between the two network positions, a link bandwidth, a traffic charge, and a traffic engineering policy;

selecting a second P2P node from the information list according to the information list, the second P2P node being capable of providing the service to the first P2P node; and acquiring the service content from the second P2P node for presentation, wherein the transmission distance between the at least one candidate P2P node and the first P2P node is represented by network addresses in different network layers, the network addresses are network addresses of the first P2P node in different network layer protocols and comprise: a public network address, a private network address under a Network Address Translation (NAT) device, layer-2 intranet addresses under different devices, and layer-3 intranet addresses under different devices; wherein a transmission distance between the first node and the at least one candidate P2P node in a layer of public network address is longer than a transmission distance between the first node and the at least one candidate P2P node in a layer of private network address under the NAT device, which is longer than a transmission distance between the first node and the at least one candidate P2P node in a layer of layer-2 intranet address, which is longer than a transmission distance between the first node and the at least one candidate P2P node in a layer of layer-3 intranet address; and position information of the first P2P node in different network layers is learned about according to different network addresses.

8. The method of claim 7, wherein the information list comprises a network address of a candidate P2P node corresponding to each network address supported by the first P2P node; each network address of the first P2P node and the network address of the corresponding candidate P2P node are network addresses in a same network layer;
correspondingly, selecting the second P2P node from the information list according to the information list comprises:
selecting the second P2P node according to the network address of the candidate P2P node corresponding to each network address; and
correspondingly, the first P2P node communicates with the second P2P node using a network address of the second P2P node to acquire the service content.

9. The method of claim 8, wherein a manner for sequencing network addresses of candidate P2P nodes corresponding to all network addresses supported by the first P2P node in the information list is a manner of sequencing in ascending order of transmission distances between the candidate P2P nodes and the first P2P node; and
correspondingly, the second P2P node is selected according to the manner for sequencing the network addresses of the candidate P2P nodes corresponding to all network addresses supported by the first P2P node in the information list.

10. The method of claim 9, further comprising:
when the service content is required to be acquired from at least two candidate P2P nodes, obtaining network addresses of the at least two candidate P2P nodes from the information list; and
communicating with the at least two P2P nodes based on the acquired network addresses to acquire the service content.

11. The method of claim 8, further comprising:
when the service content is required to be acquired from at least two candidate P2P nodes, obtaining network addresses of the at least two candidate P2P nodes from the information list; and
communicating with the at least two P2P nodes based on the acquired network addresses to acquire the service content.

12. The method of claim 7, further comprising:
when the service content is required to be acquired from at least two candidate P2P nodes, obtaining network addresses of the at least two candidate P2P nodes from the information list; and
communicating with the at least two P2P nodes based on the acquired network addresses to acquire the service content.

13. A server, comprising:
a processor; and
a memory for storing instructions executable by the processor,
wherein the processor is configured to:
receive a first request from a first Peer to Peer (P2P) node, the first request comprising a service content;
determine at least one candidate P2P node for the first P2P node using position information of the first P2P node in different network layers and the service content, the at least one candidate P2P node being capable of providing service to the first P2P node and the position information being position information generated based on a network topology structure;
generate a candidate P2P node information list using the at least one candidate P2P node, P2P node information in the information list representing a transmission distance between the at least one candidate P2P node and the first P2P node, wherein the transmission distance is a cost index of data transmission between two network positions, and the cost index comprises: a transmission delay between the two network positions, a link bandwidth, a traffic charge, and a traffic engineering policy; and
return the information list to the first P2P node, wherein the position information of the first P2P node in different network layers is represented by network addresses in different network layers, the network addresses are network addresses of the first P2P node in different network layer protocols and comprise: a public network address, a private network address under a Network Address Translation (NAT) device, layer-2 intranet addresses under different devices, and layer-3 intranet addresses under different devices; wherein a transmission distance between the first node and the at least one candidate P2P node in a layer of public network address is longer than a transmission distance between the first node and the at least one candidate P2P node in a layer of private network address under the NAT device, which is longer than a transmission distance between the first node and the at least one candidate P2P node in a layer of layer-2 intranet address, which is longer than a transmission distance between the first node and the at least one candidate P2P node in a layer of layer-3 intranet address; and
said determining the at least one candidate P2P node for the first P2P node using the position information of the first P2P node in different network layers and the service content comprises:
for each network address supported by the first P2P node, determining at least one P2P node capable of providing the service to the first P2P node based on the service content, and
selecting the P2P node of which a transmission distance with the first P2P node is shortest from the determined at least one P2P node as a candidate P2P node corresponding to said each network address.

14. The server of claim 13, wherein when the information list is generated, the processor is further configured to:
for each network address supported by the first P2P node, write a network address of the candidate P2P node corresponding to said each network address into the information list,
wherein each network address of the first P2P node and the network address of the corresponding candidate P2P node are network addresses in a same network layer.

15. The server of claim 14, wherein when the information list is generated, the processor is further configured to:
sequence, in the information list, network addresses of candidate P2P nodes corresponding to all network addresses supported by the first P2P node according to a manner of sequencing in ascending order of transmission distances between the candidate P2P nodes and the first P2P node.

16. The server of claim 13, wherein the processor is further configured to:
before receiving the first request from the first P2P node, responsive to learning that the first P2P node is on line, acquire the position information of the first P2P node from a network topology information management device.

* * * * *